March 3, 1970   T. H. RUSSELL III   3,498,640
BOOKKEEPING APPARATUS
Filed April 18, 1967   3 Sheets-Sheet 2
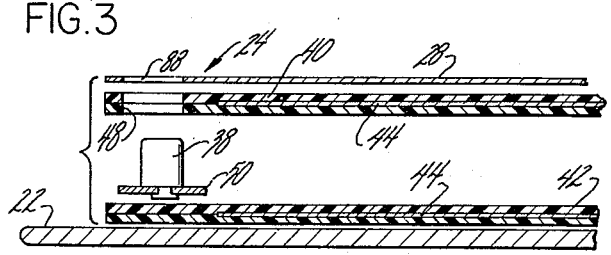
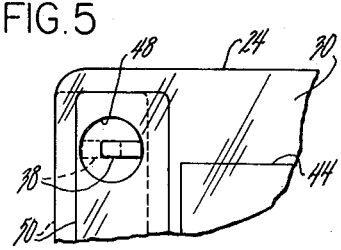
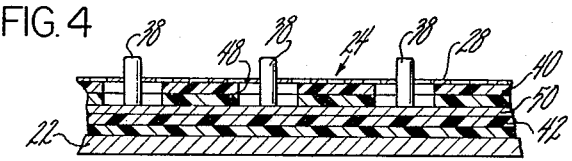
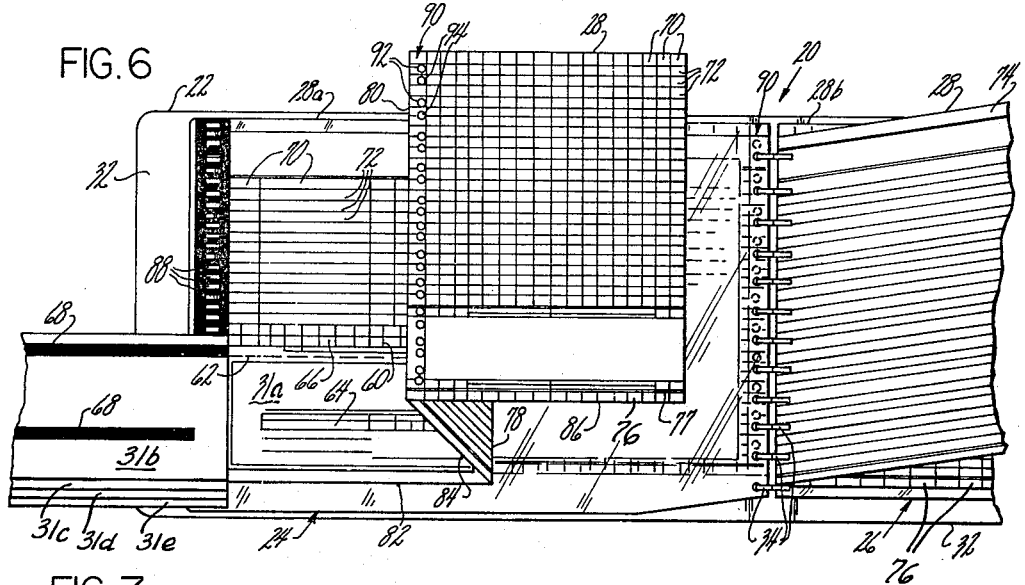
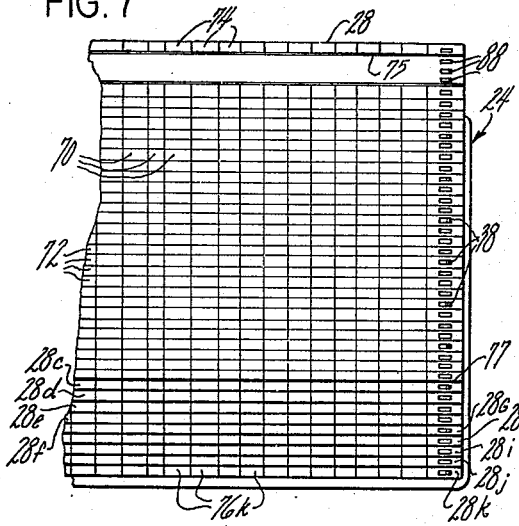
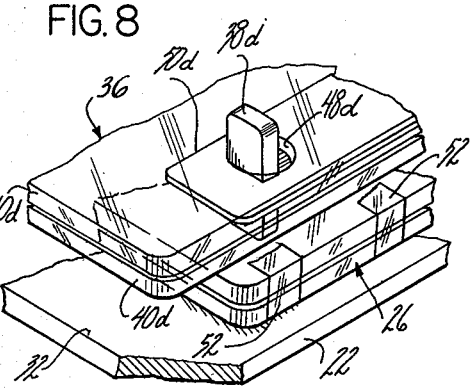

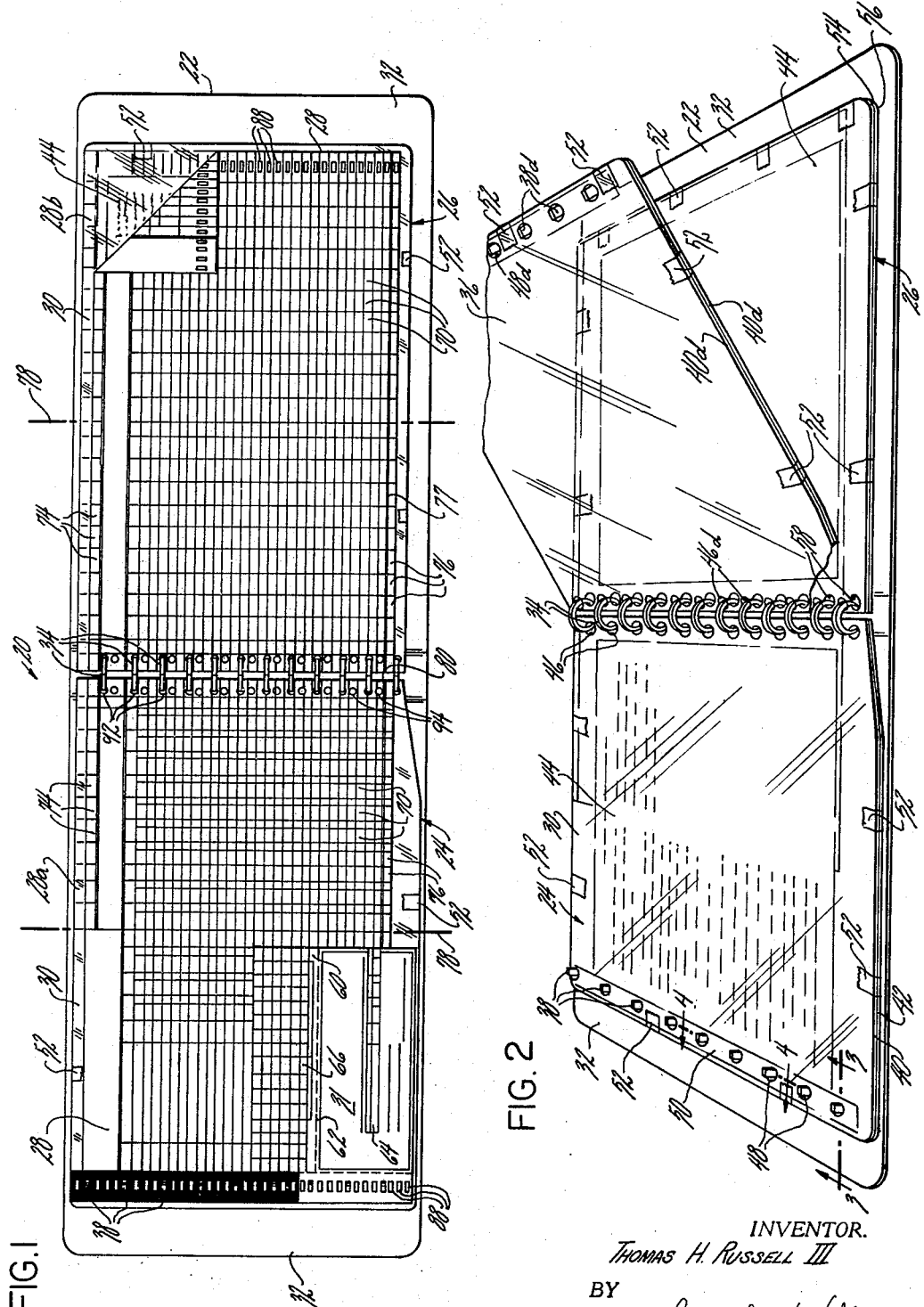

United States Patent Office 3,498,640
Patented Mar. 3, 1970

3,498,640
BOOKKEEPING APPARATUS
Thomas H. Russell III, 14 Sulgrave Road,
West Hartford, Conn. 06107
Filed Apr. 18, 1967, Ser. No. 631,661
Int. Cl. B41l 3/00
U.S. Cl. 282—29     8 Claims

ABSTRACT OF THE DISCLOSURE

This disclosure is of a bookkeeping apparatus for use in various different record keeping situations providing for storage of a plurality of individual record sheets and for arrangement thereof relative to the apparatus, each sheet to the other and to other associated bookkeeping forms to expediate a variety of bookkeeping entries. One or more master heading sheets supported by the apparatus in co-operative alignment with associated record sheets serve to identify distribution columns on the record sheets and thereby substantially reduce the operations required to prepare the record sheets to receive bookkeeping entries.

Cross reference to related application

Bookkeeping apparatus similar in some respects to the apparatus herein disclosed is shown in my U.S. Patent No. 3,236,542, issued Feb. 22, 1966, and entitled "Bookkeping Apparatus."

Background of invention

This invention relates to apparatus for bookkeeping or accounting and deals more particulary with a system of checks, or invoices, journal sheets, ledger sheets or the like wherein the drafting of the check, invoice, or similar form causes the information entered in the form to be simultaneously recorded on one or more record sheets such as the journal or ledger sheets. The general purpose in the provision of bookkeeping apparatus of the aforedescribed type is to reduce the number of operations required to prepare a record of a given transaction and a further record of the breakdown or distribution of the transaction in accordance with accepted bookkeeping procedures. That is to say an item representing a particular transaction may be distributed over any one or more of a large number of columns or catagories denoted on a record sheet. The general aim of this invention, therefore, is to provide a bookkeeping apparatus which simplifies or reduces the amount of work involved in maintaining conventional business records. A further object of this invention is to provide an apparatus of the aforedescribed general type wherein the amount of work required to prepare a record sheet to receive bookkeeping entries is substantially reduced. Another object of the invention is to provide an apparatus wherein a plurality of forms may be rapidly and accurately arranged relative to a record sheet to permit information entered on one of the forms to be directly and simultaneously duplicated on the record sheet and wherein a plurality of individual record sheets may be arranged relative each to the other so that figures representing the totals of a large number of columns on several individual record sheets may be accurately accumulated or totaled on a summary record sheet.

Summary of the invention

In accordance with this invention a bookkeeping apparatus is provided having a substantially flat generally rectangular backing panel providing a firm writing surface and including a transparent horizontal upper marginal edge portion. Holding elements associated with the backing panel provide means for attaching a record sheet thereto in cooperative alignment with a master heading sheet so that heading areas on the latter sheet visible through the transparent portion of the panel may serve to identify various distribution columns on the record sheet. The holding elements and the record sheet are constructed and arranged so that a record sheet may also function as a master heading sheet and so that a plurality of individual record sheets may be attached to the panel in vertically aligned fanned stacked relationship each to the other and to a similarly attached summary record sheet to facilitate the transfer of figures from the individual record sheets to the summary sheet for totaling thereon.

Brief description of the drawings

FIG. 1 is a plan view of a bookeeping apparatus or system embodying the present invention, this view showing two record sheets arranged in side-by side relationship each overlying an associated master heading sheet and showing a number of unused checks overlying one of the record sheets.

FIG. 2 is a perspective view of another embodiment of the invention including a binder and two backing panels which are in all respects similar to those used in the apparatus of FIG. 1, this embodiment differing from that of FIG. 1 by also including a third or central backing panel attached to the binder.

FIG. 3 is a somewhat enlarged exploded fragmentary sectional view taken along the line 3—3 of FIG. 2.

FIG. 4 is a somewhat enlarged fragmentary sectional view taken along the line 4—4 of FIG. 2.

FIG. 5 is a somewhat enlarged fragmentary plan view of the left-hand backing panel of FIG. 1.

FIG. 6 is a fragmentary view showing the manner in which one of the record sheets of FIG. 1 may be folded to bring a different panel surface into immediate underlying relationship with a check and showing all but the lowermost check folded away from the record sheet to permit the drafting of the lowermost check and the entry of information on an associated record sheet panel surface.

FIG. 7 is a plan view showing a manner in which the journal sheets may be arranged on a backing panel in fanned relationship to position the total spaces on the sheets in adjacent relationship.

FIG. 8 is a somewhat enlarged fragmentary perspective view of the apparatus of FIG. 2, but showing the center backing panel folded to a position overlying the right-hand backing panel.

Description of the preferred embodiments

Figure 9:
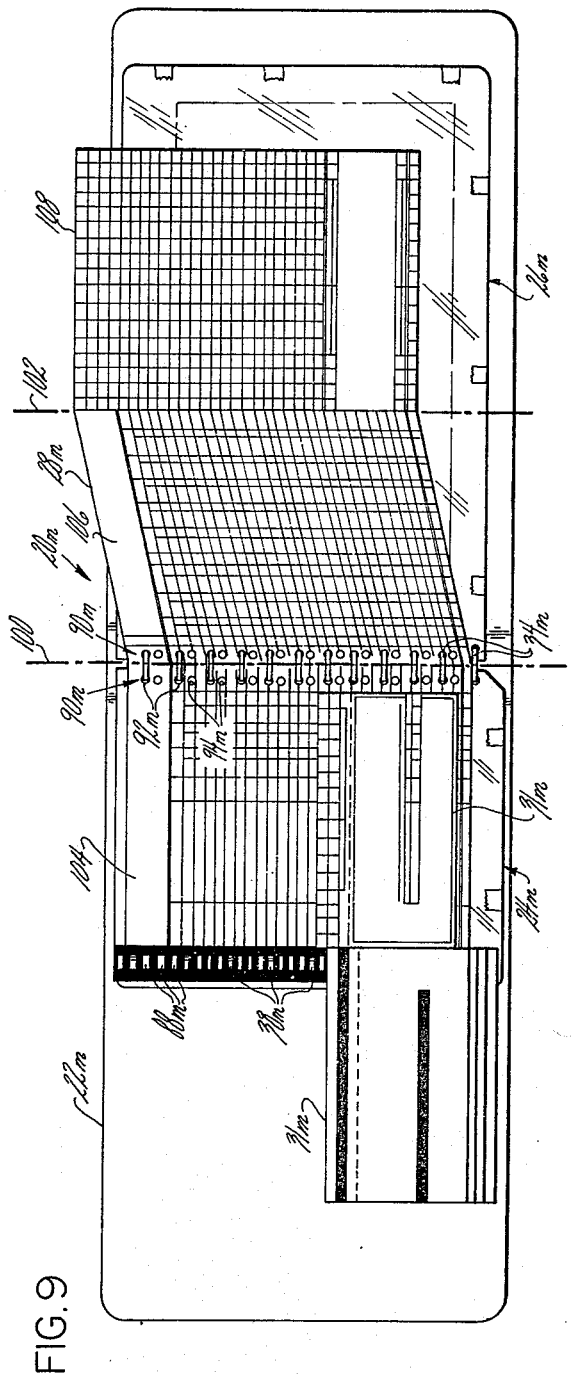
FIG. 9 is a plan view of a bookeeping apparatus showing a further embodiment of the invention.

Turning now to the drawings and first referring to FIGS. 1 and 2, a bookkeeping apparatus embodying the present invention and generally designated by the numeral 20 includes a binder 22 having attached thereto left and right-hand backing panels, respectively generally indicated at 24 and 26, and a plurality of record sheets 28, 28 which are shown to be journal sheets. Each of the backing panels includes a transparent horizontal upper marginal edge portion 30. Also attached to the binder 22 are two master heading sheets 28a and 28b which, as shown, are substantially identical to the record sheets 28, 28. Each master heading sheet has a plurality of heading areas thereon visible through the transparent portion of an associated backing panel. Each of the master heading sheets is held in cooperative alignment with an associated record sheet 28 so that the heading areas thereon identify distribution columns on the record sheet. Attached to the panel 24 in overlying relationship to one of the record sheets 28 is a stack of forms 31, 31 which are shown to be checks.

The binder 22 includes two covers 32, 32 foldable between open and closed positions relative to one another about a vertical row of spaced holding elements or rings 34, 34. Preferably the rings are of the type employed in conventional loose leaf ring binders and are collectively separable for the removal or addition of record sheets or backing panels. At this point it should be noted that in FIG. 2 the binder 22 is shown to have a third or central backing panel 36 attached thereto. The apparatus including this central backing panel comprises a further embodiment of the invention and as such will be hereinafter further discussed. When the apparatus is in an open position as it appears in the drawings the panels 24 and 26 attached to the rings 34, 34 are located on opposite sides thereof and each provides a supporting surface for one or more associated record sheets. Thus, when two record sheets 28, 28 are attached to the rings 34, 34 and are supported in a posting position or in side-by-side relationship by the panels 24 and 26 an entry made on the front surface of one record sheet may be carried across to distribution columns on the rear surface of the associated sheet. At least one of the backing panels includes holding elements for securing a record sheet 28 and the checks 31, 31 in a fixed cooperative relationship with one another and with the binder. These holding elements may be variously positioned with respect to an associated backing panel and may take various forms without departing from the invention, but preferably consist of a vertical row of spaced pegs 38, 38 located along the left-hand vertical edge of the left-hand backing panel 24.

The backing panels 24 and 26 may also be made from various materials and may take various forms. In the illustrated case for using the apparatus 20 form a permanent part thereof and are carried by the backing panels. The backing panels also serve as boosters for the binder to aid in lifting and moving the record sheets over the rings 34, 34 when the binder is folded to a closed position. Each of the backing panels 24 and 26 is made from two leaves of flexible transparent plastic laminate arranged in adjacent overlying relationship, so as to be capable of receiving a master heading sheet such as 28b therebetween, and joined together along at least one free edge. Thus, each backing panel may serve to protect both sides of an associated master heading sheet and to prevent the sheet from being torn, frayed, soiled or otherwise damaged in use.

Considering more particularly the left-hand panel 24, this panel is generally rectangular in shape and has a vertical dimension substantially greater than the vertical dimension of a record sheet 28 to provide a firm writing surface for both a record sheet and all of the checks 31, 31. That is, the lowermost checks in the stack extend below the lower edge of the associated record sheet 28 and the panel 24 also extends below this record sheet to provide support for such checks. The panel 24 is made of two plastic leaves 40 and 42 each of which has a page 44 laminated therein and carrying printed instructions so as to be visible therethrough. The upper side edge of each page 44 is spaced downwardly from the upper edge of the leaf in which it is contained so that the upper marginal edge portion of the panel 24 formed by the two leaves is transparent. Each of the leaves 40 and 42 includes spaced openings 46, 46 in its right-hand vertical edge portion which are adapted to receive the rings 34, 34 as shown in FIG. 2. Along its left-hand vertical edge portion the leaf 40 has a vertical row of spaced peg-receiving openings 48, 48. The pegs 38, 38 are attached to a relatively thin elongated strip 50 received between the leaves 40 and 42 with each peg 38 projecting upwardly through an associated one of the openings 48, 48 as best shown in FIGS. 3 and 4. Each peg 38 has a generally rectangular cross section and is somewhat smaller than the associated opening 48 in which it is received. Thus, the pegs may be moved in unison relative to the backing panel 24 both vertically and horizontally or generally toward and away from the rings 34, 34 as between the solid line and broken line positions indicated in FIG. 5. The movable arrangement of the pegs serve to assure that each record sheet 28 will lie in a flat position on the panel 24 to which it is attached by compensating for variations in the horizontal spacing between groups of ring and per-receiving openings in the record sheets such as may occur when the openings are punched in the sheets during manufacture. The movable pegs also effectively compensate for expansion or shrinkage of the sheets due to changes in atmospheric conditions. In the illustrated case the leaves 40 and 42 are joined together at all four of their edges by strips of transparent plastic adhesive tape 52, 52. Removal of the tape strips 52, 52 securing the leaves along one or more of the edges permits removal and replacement of a master heading sheet held therebetween.

The right-hand backing panel 26 is generally similar to the panel 24 and is made of from two generally rectangular leaves of plastic laminate 54 and 56 each of which may include an additional instruction page 44. The two leaves 54 and 56 are joined by strips of tape 52, 52. The panel 26 does not however include a group of pegs such as the pegs 38, 38 of its panel 24 and preferably has a vertical dimension only slightly greater than the vertical dimension of a record sheet 28 since it need not provide support for any associated checks. On the left-hand vertical margin of the panel 26 is a plurality of vertically spaced openings 58, 58 for receiving the rings 34, 34, as best shown in FIG. 2.

The checks 31, 31 are arranged in a fanned relationship with their side edges aligned and with the upper edge of each check positioned a predetermined distance upwardly beyond the upper edge of the adjacent overlying check. In FIG. 1 a partial stack of checks 31, 31 is shown while in FIG. 6 the stack is shown after additional checks have been used and removed therefrom leaving a total of five unused checks in the stack designated at 31a–31e. From FIG. 6 it will be noted that the arrangement of the checks is such that all except the lowermost check 31a may be folded to the left to completely expose the lowermost checks to permit its drafting and entry of other information thereon. The checks are of conventional rectangular shape and the main bodies thereof are preferably perforated along their left-hand edges to permit the same, after the check has been drafted, to be esaily torn from the edge portion which is received on the pegs 38, 38 of the backing panel 24. Each check also includes a stub 60 located above the main body of the check and attached thereto along a horizontal perforated line 62. Included on each check is one horizontal line or area 64 for receiving various entries concerning the transaction evidenced by the check. For example, the check may be a dual purpose check designed for both payroll and non-payroll disbursements in which case the line 64 might include spaces for recording the name of the payee, the date, and the amount of the check. Also included on the check 31 is a second horizontal line or area 66 for recording the same and more additional information regarding the transaction, this line being located on the stub 60 and spaced vertically a given distance from the line 64. The information entered on the lines 64 and 66 of each check is simultaneously duplicated on the record sheet 28 at desired locations so as to eliminate the later need for posting the information as a separate operation. Various different means may be employed for causing duplication of the entries written on the checks on the immediate underlying record sheet surface, and in the present instance this means is shown to consist of areas of spot carbon coating such as indicated at 68, 68 located on the undersurface of each check and registering with the lines 64 and 66 thereon.

Each record sheet 28 is generally rectangular and has a plurality of vertical columns 70, 70 marked thereon by horizontally spaced vertically extending lines, and also includes a plurality of vertically spaced horizontally extending lines which divide the columns into entry areas 72, 72. A plurality of spaces or columns heading areas 74, 74 are provided along the extreme upper marginal edge portion, sometimes referred to as the upper bleed edge, of each sheet, each heading area being vertically aligned with an associated vertical column 70. These columns heading areas are delineated in part by a horizontal line 75, preferably a double or heavy line, which defines the lower extent of the areas. Adjacent the extreme lower marginal edge portion, sometimes referred to as the lower bleed edge, of the sheet 28 is a plurality of total spaces 76, 76 each vertically aligned with an associated column 70. The total spaces 76, 76 are delineated in part by a horizontal line 77, preferably a double or heavy line, which defines the upper extent of the spaces. The record sheet preferably is foldable about one or more vertical fold lines which are or may be pre-scored in the material of the sheet and which divide the sheet into two or more adjacent panels, each providing two panel surfaces located reepectively on opposite sides thereof. For example, as best shown in FIG. 6, the record sheet 28 includes two vertical fold lines 78 and 80 which divide the sheet into three panels 82, 84 and 86.

Means for attaching each record sheet to the apparatus is provided by two horizontally spaced groups of openings in the sheet respectively adapted to receive the rings 34, 34 and the pegs 38, 38. The two groups of openings may be variously positioned relative to the record sheet, but preferably the sheet 28 includes one group of openings 88, 88 along one vertical edge for receiving the pegs 38, 38. For attachment to the rings 34, 34 each sheet 28 additionally contains another group of openings including two vertical rows of openings 90, 90, each located on a respective side of the fold line 80 so that the record sheet may be attached to the rings 34, 34 with the panel 86 folded into adjacent relationship with the panel, as best shown in FIG. 6.

The openings in each row 90 further includes first and second sets of openings arranged in alternate series and respectively indicated at 92, 82 and 94, 94 each set of openings being adapted to collectively receive the rings 34, 34 to the exclusion of the other set.

In FIG. 1 each of the record sheets 28, 28 are shown attached to the binder with the rings 34, 34 received in the openings 92, 92 of the first set so that the sheet is held in a first position relative to an associated backing panel. In this first position the upper edge of each record sheet 28 is spaced downwardly a predetermined distance from the upper edge of its associated backing panel. Considering the record sheet 28 associated with the right-hand backing panel 26 as it appears in FIG. 1, the upper edge of the record sheet 28 is downwardly spaced from the upper edge of the panel 26 a predetermined distance at least equal to the vertical dimension of the heading areas on the master heading sheet 28b. Thus the panel transparent portion 30 and the heading areas on the master heading sheet 28b thereunder are visible above the upper edge of the associated record sheet 28. The second set of openings 94, 94 in each sheet 28 are arranged to cooperate with the rings 34, 34 to hold the sheet in a second position wherein it serves as a master heading sheet. The spacing between each opening 92 of the first set and the associated opening 94 of the second set is approximately equal to the spacing between the upper edge of the sheet and the line 75 defining the bottom of the master column heading areas so that when switching the holding elements from one set of openings to the other record sheet is shifted vertically by an amount equal to the vertical dimension of the master column heading areas so that when in its second position the line 75 of the record sheet is approximately aligned with the line defined by the upper edge of the sheet when in its first position. In the illustrated example the two sets of openings 92, 92 and 94, 94 are independent of one another, however it should be understood that if the holding elements 34, 34 were spaced from one another by the same spacing as between the upper edge of the sheet and the line 75 the first set of openings would also constitute the second set.

At this point it should be noted that while a record sheet serves as a master heading sheet in the illustrated case heading sheets of other types may also be used in practicing the invention. For example, a heading sheet suited to the record-keeping requirements of a particular type of business and having appropriate printed column headings thereon may be employed. When such a special purpose heading sheet is provided it is preferably made with only one set of openings therein for receiving the rings 34, 34. This arrangement prevents erroneous positioning of the heading sheet with respect to the apparatus. The readily interchangeable arrangement of the master heading sheets provides for possible changes in heading requirements from time to time.

When the apparatus is arranged as shown in FIG. 6 with the checks 31, 31 attached to the pegs 38, 38 and overlying a record sheet 28 also attached to the pegs, the record sheet may be detached from the rings 34, 34 and folded along its fold lines 78 and 80 to bring any one of three panel surfaces into immediate underlying or posting relationship with an active check. For a further description of the manner in which a record sheet may be folded to facilitate duplicate posting reference may be had to my aforedescribed U.S. patent entitled "Bookkeeping Apparatus." To facilitate detachment of a record sheet from the rings the flexible panel 24 is bent or flexed about a generally vertically extending axis to move the pegs 38, 38 generally toward the rings 34, 34 so that the sheet may be separated from the rings without risk of damage to the ring-receiving openings 92, 92 or 94, 94.

The apparatus of the present invention may also be used to facilitate accurate summation of totals, entered in the total spaces 76, 76 of a plurality of individual record sheets, onto a summary record sheet. Preparatory to totaling the data accumulated in the total spaces associated with various distribution columns on a plurality of record sheets 28, 28 the checks 31, 31 are removed from the pegs 38, 38 and the various record sheets to be summarized are attached thereto in fanned stacked relationship above an underlying summary record sheet. When the data to be summarized appears on the front surface of the record sheets the various sheets may be attached to the backing panel 24 with the backing panel in its normal position at the left-hand side of the binder but preferably the panel is first removed from the rings 34, 34. To summarize data appearing on the rear surface of the record sheets, the binder 22 may be moved from a posting position to an inverted position wherein the pegs 38, 38 are located to the right of the rings 34, 34. Preferably however panel 24 is completely detached from the binder and arranged on a table or other supporting surface so that the pegs are located along the right-hand margin of the panel. In FIG. 7 the backing panel 24 is shown in this position with a plurality of record sheets, indicated individually at 28c to 28j, arranged thereon in fanned stacked relationship to a summary record sheet 28k. The pegs 38, 38 and the openings 88, 88 are so arranged that when the record sheets are attached to the pegs in a fanned stack the lower side edge of each of the record sheets is positioned a predetermined distance upwardly beyond the lower side edge of the adjacent underlying record sheet to expose the total spaces 76, 76 of the latter sheet. The various total spaces to be summarized are thus vertically aligned in generally adjacent relationship each to the other and to total spaces 76k, 76k on the summary sheet 28k. The summary record sheet 28k may for example be a grand summary sheet covering a period of one or more years and having each of its horizontal columns representing the total entries in various catagories for a separate month, the sheet 28k being shifted on its peg each month to bring into play a new month line.

When the record sheets are arranged for summarizing, it will be noted that the heading areas on the master heading sheet may be covered by one or more of the overlying record sheets since it is generally not necessary to refer to the various column heading areas when this totaling operation is performed. However, if it is desired that the heading areas be visible, this may be accomplished by arranging the various record sheets on the pegs so that the lower side edges of the sheets are spaced downwardly some distance from the lower edge side edge of the backing panel. After the data on the various record sheets has been transferred to the summary record sheet 28k the individual record sheets and the summary record sheet may be reattached to the rings 34, 34 in a first position at which time the totals on the summary sheet may be readily identified from the heading areas on the master heading sheet.

The apparatus as shown in FIG. 2 is particularly adapted to accommodate two sets of record sheets which may, for example, comprise a set of cash disbursement journals and a set of purchase journals. The journal sheets may comprise a plurality of record sheets (not shown) similar to the sheets 28, 28 of FIG. 1, attached to the rings 34, 34 between the left-hand backing panel 24 and the cental backing panel 36. A generally similar set of record sheets (not shown) may be attached to the binder between the central backing panel 36 and the right-hand backing panel 26. In most respects the backing panel 36 is generally similar to the previosuly described backing panel 24, and may include additional pages of instructions (not shown) laminated in the leaves thereof. Like the panel 24 it is made of two leaves 40d, 40d of transparent sheet material and is generally rectangular having a vertical dimension substantially greater than the vertical dimension of the associated record sheets. The leaves are joined along one or more edges of the panel by suitable fastening means such as strips of plastic adhesive tape 52, 52, however, the leaves may be unjoined along at least one edge of the panel to allow the insertion therebetween of a master heading sheet or sheets. When a master heading sheet is so positioned between the leaves it is visible from either side of the panel. Each leaf 40d also includes spaced openings 46d, 46d in its inner vertical marginal portion adapted to receive the rings 34, 34. Along its outer or free vertical edge portions each of the leaves 40d has a vertical row of spaced peg receiving openings 48d, 48d. Pegs 38d, 38d are fixed to and extend from opposite sides of a relatively thin elongated strip 50d received between the sheets 40d, 40d. Each peg 38d projects through an an associated one of the openings 48d in one of the leaves 40d. As in the previously described embodiment the peg receiving openings 48d, 48d are substantially larger than the pegs received therein so that the pegs may be moved in unison generally toward and away from the rings 34, 34.

When the central backing panel 36 is positioned adjacent the left-hand backing panel 24 it will be evident that the journal sheets 28, 28 are exposed in a posting position and the apparatus appears generally as illustrated in FIG. 1. However, when the central backing panel 36 is moved to the right-hand side of the apparatus or adjacent the right-hand backing panel 26 the pegs 38d, 38d are positioned at the right-hand side of the apparatus so that the journal sheets may be arranged in a fanned stack on the panel 36 in the manner previously described with reference to FIG. 7 to facilitate summarization of data appearing on the rear surface of the sheets without detaching the panel from the binder.

In FIG. 9 is shown another apparatus embodying the invention and particularly adapted for use with a record sheet having two or more adjacent panels each including two panel surfaces. The record sheet is constructed and arranged so that the panels may be folded with respect each to the other and to a stack of forms or checks held by the apparatus to position one of two or more panel surfaces in posting relationship with an active check without detaching the record sheet from the apparatus. The apparatus indicated generally at 20m includes a binder 22m carrying a vertical row of spaced holding element or rings 34m, 34m and is generally similar in all respects to the binder 22 previously described. Attached to the rings 34m, 34m are backing panels 24m and 26m. The panel 26m is substantially identical to the panel 26, however, the panel 24m differs from the previously described panel bearing the same numeral prefix in that it has a substantially smaller horizontal dimension. Along its left vertical edge the panel 24m carries a vertical row of spaced pegs 38m, 38m constructed and arranged with respect to the panel in a manner generally similar to the previously described pegs 38, 38. A record sheet 28m is shown attached to both the rings 34m, 34m and the pegs 38m, 38m in underlying relationship to a stack of checks 31m, 31m along its left vertical edge the record sheet 28m has one group of openings 88m, 88m for receiving the pegs 38m, 38m. It also includes two vertical fold lines 100 and 102 which divide the sheet into three panels respectively indicated at 104, 106 and 108 each having two panel surfaces. The record sheet 28m also has a second group of openings which includes two rows of openings 90m, 90m, each row being located on an opposite side of the fold line 100. Each row of openings 90m further includes first and second sets of openings respectively indicated at 92m, 92m and 94m, 94m and arranged in alternate series. Each set of openings is adapted to collectively receive the rings 34m, 34m to the exclusion of the other set so that a plurality of record sheets may be arranged with respect to the apparatus and to each other in the various manners generally aforedescribed. The openings 92m, 92m and 94m, 94m are of such size that the panel 106 may be folded along the fold line 100 to a position overlying the panel 104 while the record sheet is attached to the rings without risk of damage to the record sheet. The horizontal dimensions of the various panels are such that the panels may be folded to bring the surfaces thereof into various position adjacent each to the other without interference occurring between the fold line 100, the vertical free edge of the record sheet and the pegs or the rings. For a further description of the manner in which the record sheet may be folded to position the various panels for duplicate posting further reference may be had to my aforedescribed U.S. patent.

I claim:
1. Bookkeeping apparatus comprising a binder having two covers, a first row of holding elements carried by said binder, said covers being foldable about said first row between open and closed positions and in said open position being located on opposite sides of said first row, a substantially flat generally rectangular backing panel providing a firm writing surface and having one vertically extending row of openings through one side marginal portion thereof for receiving said first row of holding elements, said backing panel being disposed between said covers in said closed position and including two leaves of sheet material located in adjacent overlying relationship to one another and separated from one another over a substantial portion of their area, at least one of said leaves having another vertical extending row of openings therethrough horizontally spaced from said one row of openings, a relatively thin strip received between said leaves, a second row of holding elements projecting from at least one side of said strip, each of said holding elements in said second row being loosely received in and projecting through an associated one of said openings in said other row of openings, said holding elements in said second row being both horizontally and vertically movable in unison relative to said backing panel and said first row of holding elements, at least one of said leaves having a transparent horizontal marginal portion through which a plurality of heading areas marked on a master heading sheet disposed between said two leaves are visible, and at least one generally rectangular record sheet having a plurality of vertical columns marked thereon by horizontally spaced vertically extending lines and including a line of spaces extending along at least a part of one bleed edge thereof, said line of spaces being partially defined by a horizontal edge of said sheet and a horizontally extending line marked on said sheet and spaced inwardly from said horizontal edge, said record sheet having one group of openings including a first set of openings for receiving holding elements in said first row of elements to hold said record sheet in a first position relative to said backing panel, said record sheet in said first position overlying an associated portion of said backing panel and spaced a predetermined distance downwardly from the upper edge of said panel to expose said transparent marginal portion, said record sheet having a second set of openings for receiving holding elements in said first row of holding elements to hold said record sheet in a second position wherein said record sheet is displaced vertically from said first position a distance sufficient to locate said horizontal line approximately in line with the line defined by said horizontal edge when said record sheet is in said first position, said record sheet having a second group of openings receiving holding elements in said second row of holding elements when said record sheet is in said first and second positions.

2. Bookkeeping apparatus as set forth in claim 1 including another record sheet disposed between said leaves and retained in said second position by said holding elements, said other record sheet comprising said master heading sheet.

3. Bookkeeping apparatus as set forth in claim 1 further characterized by said backing panel being made of flexible resilient material so that it may be bent to move said first row of holding elements generally toward said second row of holding elements.

4. Bookkeeping apparatus as set forth in claim 1 further characterized by the holding elements of at least one of said rows consisting of a plurality of rings.

5. Bookkeeping apparatus as set forth in claim 1 further characterized by said line of spaces comprising a line of column total areas extending along the lower bleed edge of said record sheet, and said second group of openings and said second row of holding elements being so arranged that said record sheet may be held solely by said second row of holding elements in a number of different vertical positions spaced equally from one another and in each of which positions the lower horizontal edge of said record sheet is located approximately in line with the locus of said horizontal line when said record sheet is positioned in the next lower vertical position.

6. Bookkeeping apparatus as set forth in claim 1 further characterized by at least one of the said rows of holding elements comprising a plurality of pegs.

7. Bookkeeping apparatus as set forth in claim 1 including a plurality of generally rectangular forms arranged in a fanned stack with their vertically extending end edges aligned and with the upper horizontal edge of each form positioned a predetermined distance upwardly beyond the corresponding edge of the adjacent overlying form, said forms including openings along one edge thereof for receiving holding elements of said second row to hold said forms in overlying relationship with said record sheet, and transfer means for causing written entries made on said forms to be duplicated on an immediately underlying surface of said record sheet.

8. Bookkeeping apparatus as set forth in claim 1 wherein said first row of holding elements comprises a plurality of rings said record sheet includes first and second panels in side-by-side relationship separated by a first vertical fold line and foldable relative to one another, said first set of openings including two rows of openings located with one row on either side of said first fold line for receiving said rings, said second group of openings being located in said first panel, said second panel being foldable along said first fold line while said record sheet is attached to said rings and said second row of holding elements.

References Cited

UNITED STATES PATENTS

| | | | |
|---|---|---|---|
| 1,696,156 | 12/1928 | Fenton | 24—213 |
| 1,965,520 | 7/1934 | Boden | 24—73 |
| 2,068,262 | 1/1937 | Brown | 129—1 |
| 2,637,570 | 5/1953 | Griffin | 282—29 |
| 2,718,413 | 9/1955 | Frannsson et al. | 282—29 |
| 3,142,496 | 7/1964 | Rideout | 382—29 |
| 3,236,542 | 2/1966 | Russell | 282—29 |

FOREIGN PATENTS

| | | |
|---|---|---|
| 775,058 | 10/1934 | France. |
| 1,185,577 | 1/1965 | Germany. |
| 109,341 | 12/1943 | Sweden. |

JEROME SCHNALL, Primary Examiner

U.S. Cl. X.R.

282—16

PO-1050
(5/69)

UNITED STATES PATENT OFFICE
CERTIFICATE OF CORRECTION

Patent No. 3,498,640                Dated March 3, 1970

Inventor(s) Thomas H. Russell III

It is certified that error appears in the above-identified patent and that said Letters Patent are hereby corrected as shown below:

Col. 1, line 16, "expediate" should read --expedite--; line 29, "Bookkeping" should read --Bookkeeping--.
    Col. 2, line 15, "bookeeping" should read --bookkeeping--; line 17, "side-by side" should read --side-by-side--.
    Col. 4, line 5, "per-receiving" should read --peg-receiving--; line 40, "checks" should read --check--.
    Col. 5, line 39 "82" should read --92--; line 66, following "other" --the-- should be inserted.
    Col. 7, line 24, "cental" should read --central--; line 28, "previousuly" should read --previously--; line 44, "portions" should read --portion--.
    Col. 8, line 61, "vertical" should read --vertically--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents